United States Patent
Ishikawa et al.

(10) Patent No.: US 9,141,739 B2
(45) Date of Patent: Sep. 22, 2015

(54) LSI DESIGN METHOD

(71) Applicant: RENESAS ELECTRONICS CORPORATION, Kanagawa (JP)

(72) Inventors: Ryoji Ishikawa, Kanagawa (JP); Osamu Kobayakawa, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 0 days.

(21) Appl. No.: 13/769,885

(22) Filed: Feb. 19, 2013

(65) Prior Publication Data
US 2013/0219352 A1 Aug. 22, 2013

(30) Foreign Application Priority Data
Feb. 22, 2012 (JP) ................................ 2012-036097

(51) Int. Cl.
*G06F 17/50* (2006.01)

(52) U.S. Cl.
CPC ........ *G06F 17/5045* (2013.01); *G06F 17/5068* (2013.01); *G06F 2217/62* (2013.01); *G06F 2217/78* (2013.01); *G06F 2217/84* (2013.01)

(58) Field of Classification Search
CPC ............ G06F 2217/62; G06F 2217/84; G06F 17/505; G06F 1/10; G06F 17/5045; G06F 217/78; G06F 17/5068
USPC ......... 716/101, 108, 109, 113, 114, 132, 133, 716/134, 139
See application file for complete search history.

(56) References Cited

U.S. PATENT DOCUMENTS

| | | | | |
|---|---|---|---|---|
| 6,053,950 | A * | 4/2000 | Shinagawa | 716/114 |
| 6,550,044 | B1 * | 4/2003 | Pavisic et al. | 716/114 |
| 6,574,781 | B1 * | 6/2003 | Harada et al. | 716/114 |
| 6,651,224 | B1 * | 11/2003 | Sano et al. | 716/114 |
| 6,910,196 | B2 * | 6/2005 | Cocchini | 716/114 |
| 6,941,533 | B2 * | 9/2005 | Andreev et al. | 716/105 |
| 7,075,336 | B2 * | 7/2006 | Kojima et al. | 326/93 |
| 7,486,126 | B2 * | 2/2009 | Shimazaki | 327/295 |
| 7,739,641 | B1 * | 6/2010 | Barnes | 716/113 |
| 7,739,642 | B2 * | 6/2010 | Albrecht | 716/113 |
| 7,810,061 | B2 * | 10/2010 | Minonne et al. | 716/113 |
| 7,996,796 | B2 * | 8/2011 | Nonaka et al. | 716/100 |
| 8,584,065 | B2 * | 11/2013 | Iyer et al. | 716/108 |
| 8,793,630 | B2 * | 7/2014 | Ge et al. | 716/108 |
| 2006/0053395 | A1 * | 3/2006 | Lai et al. | 716/6 |

(Continued)

FOREIGN PATENT DOCUMENTS

| | | | |
|---|---|---|---|
| JP | 2002-108962 A | 4/2002 | |
| JP | 2006-031141 A | 2/2006 | |
| JP | 2006-319162 A | 11/2006 | |

*Primary Examiner* — Helen Rossoshek
(74) *Attorney, Agent, or Firm* — Mattingly & Malur, PC

(57) ABSTRACT

Buffers on a clock tree are reduced, as long as there is enough set-up margin, in order to reduce power consumption in the clock tree. An FF group coupled to a partial tree, which is a part of the clock tree and expanded from the branch point being focused on, is defined as the target FF and the other FFs are defined as non-target FFs. The target buffer of an elimination candidate and the target and non-target FFs are defined so as not to change the slack in principle in a signal propagation path between the non-target FFs even if the buffer is eliminated. The buffer which can be eliminated is specified within a range in each signal propagation path which has a start point at the non-target FF and an end point at the target FF and in each signal propagation path between the target FFs.

10 Claims, 8 Drawing Sheets

(56) References Cited

U.S. PATENT DOCUMENTS

| | | | |
|---|---|---|---|
| 2006/0253823 A1* | 11/2006 | Matsumura et al. | 716/6 |
| 2008/0129362 A1* | 6/2008 | Kawai | 327/292 |
| 2008/0222588 A1* | 9/2008 | Nonaka et al. | 716/10 |
| 2011/0283248 A1* | 11/2011 | Irie | 716/120 |
| 2013/0043924 A1* | 2/2013 | Romeo | 327/288 |
| 2014/0181779 A1* | 6/2014 | Cao | 716/134 |
| 2014/0225645 A1* | 8/2014 | Sharma et al. | 326/98 |

* cited by examiner

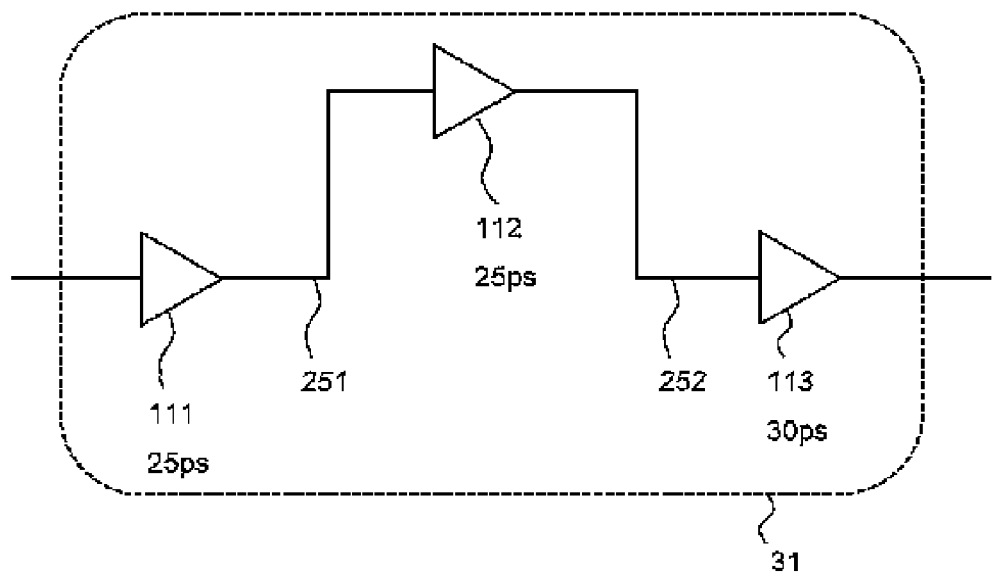
FIG. 6A  BEFORE BUFFER ELIMINATION
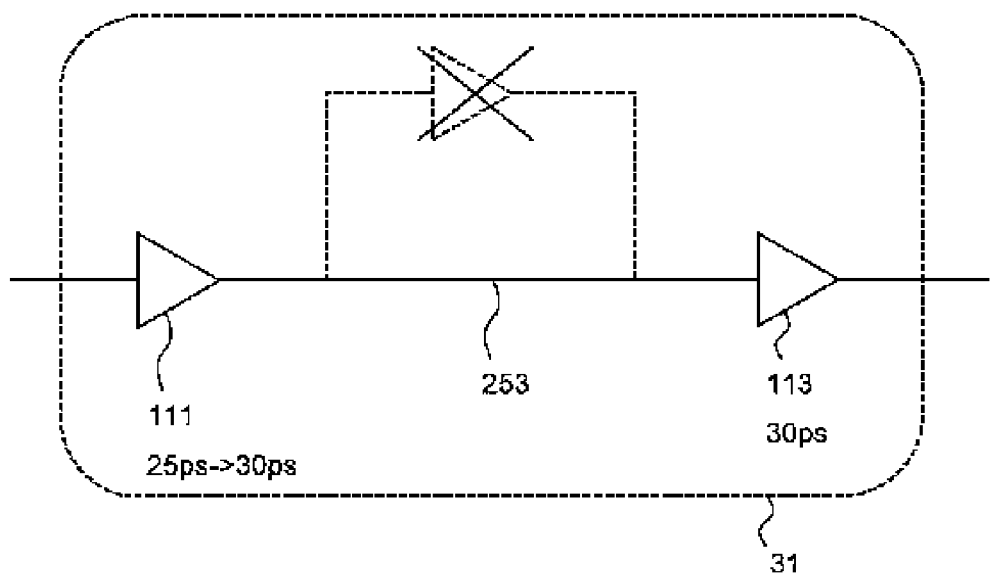
FIG. 6B  AFTER BUFFER ELIMINATION

LSI DESIGN METHOD

CROSS-REFERENCE TO RELATED APPLICATION

The disclosure of Japanese Patent Application No. 2012-036097 filed on Feb. 22, 2012 including the specification, drawings and abstract is incorporated herein by reference in its entirety.

BACKGROUND

The present invention relates to an LSI design method, and, in particular, relates to a technique which is effective for suppressing power consumption due to a clock tree.

For a logic LSI, there is typically used synchronous design providing a clock tree from a clock generation source to a flip-flop (hereinafter, abbreviated as FF) which is operated in synchronization with a clock therefrom. A combination circuit exists between the FFs and a timing specification such as a set-up time and a hold time is defined by a relationship among a clock skew, a signal propagation delay by the combination circuit, and a clock period. The clock skew represents a time difference when the clocks arrive at one pair of FFs, which are a start point and an end point of signal propagation, from the clock generation source. When the start point FF shifts output level in synchronization with the clock, the logic operation result arrives at the endpoint FF having a signal propagation delay by the combination circuit. The arrival timing needs a certain degree of margin for the clock period, and the margin is referred to as the set-up time. Further, the hold time is defined for preventing a problem referred to as racing that the signal propagation delay is too small and the signal level shift at the start point appears in the output of the end point within the same clock period.

Such an LSI design method generally includes the steps of Logic Synthesis, Clock Tree Synthesis (CTS), placement and routing, timing analysis, and verification.

In the Logic Synthesis, a logic circuit is synthesized at a gate level from an input of a logic which is designed by a designer in a format of high-level logic description. The logic circuit is synthesized typically by synchronous design which provides a clock tree from a clock generation source to FFs which are operated in synchronization with a clock therefrom. The FFs are disposed at a start point and an end point of signal propagation delay by a combination circuit and configure timing definition circuits in the synchronous design. When the FF which is the timing definition circuit at the start point shifts output level in synchronization with the clock, the logic operation result arrives at the FF which is the timing definition circuit at the end point, through a signal propagation delay by the combination circuit. The arrival timing needs a certain degree of margin for the clock period and the margin is referred to as a set-up time. Meanwhile, a hold time is defined for preventing a problem referred to as racing that the signal propagation delay is too small and the signal level shift at the start point appears in the output of the end point within the same clock period. The timing definition circuit includes not only the FF but also a latch circuit, a clock-synchronous type memory, a gate circuit which controls clock gating, and the like.

In the Clock Tree Synthesis (CTS), clock buffers are configured to form a tree shape so as to supply the clock from the clock generation source to all the timing definition circuits such as the FFs. For supplying the clocks from one clock generation source to many timing definition circuits, the number of supply targets is increased through a plurality of times of branching. One or a plurality of buffers is provided in series in each of a plurality of branches extended from a branch point and further coupled to the next branch point. In the synchronous design, generally, the design is performed so that the clock arrives at all the timing definition circuit at the same time. This is because the Logic Synthesis is carried out on the premise of the above requirement. An error of time when the clock arrives at the timing definition circuit is referred to as a skew.

The placement and routing determines an arrangement of cells corresponding to respective gates of the logic circuit and performs routing between the cells. As a result, LSI layout information is generated.

The timing analysis includes dynamic timing analysis of performing transient analysis and Static Timing Analysis (STA) which extracts a load capacitance and a wiring resistance of a wiring, thereby calculates a delay time for each gate and performs the timing analysis by addition and subtraction of the delay times, without performing the transient analysis. The STA, which requires a small operation amount, is employed typically in LSI design for a large circuit scale. The STA calculates a signal propagation delay from the clock generation source to the timing definition circuit of the start point or the endpoint by accumulating the delays of the clock buffers, calculates a signal propagation delay by a combination circuit between the start point and the end point, and calculates margins to the set-up time and the hold time. The margin for the set-up time is referred to as a slack, and the slack is expressed to be negative when violation occurs and expressed to be positive when a margin exists. The STA calculates all the margins to the set-up time and the hold time for all the combination circuits having the start points and the end points at all the timing definition circuits. When the STA is performed after the placement and routing, a parameter affecting the delay such as the load capacitance and the wiring resistance is extracted from the layout information and the delay can be calculated more accurately.

The verification includes Design Rule Check (DRC) and circuit layout verification (LVS; Layout vs. Schematic), and performs verification of various kinds of rules in the layout information and agreement verification between a layout and a circuit diagram.

In contrast, reduction of power consumption in a logic LSI is a subject which has become more and more important and, in particular, it is extremely important to reduce power consumption of a clock system represented by the clock tree. Although the circuit scale of the clock tree is smaller than that of the combination circuit, since state transition probability per unit time of the clock is several times higher than that of data, the power consumption of the clock tree occupies a comparatively high ratio in the logic LSI. Accordingly, suppression of the power consumption in the clock tree contributes greatly to the reduction of the power consumption in the whole logic LSI.

Patent Document 1 (Japanese Patent Laid-Open No. 2006-031141) discloses a technique of adjusting the arrival time of the clock at the FF for resolving the set-up violation. This is a technique of eliminating the worst slack in the set-up violations by adding or removing the clock buffer in the clock tree.

Patent Document 2 (Japanese Patent Laid-Open No 2002-108962) discloses a flow optimizing a clock line for resolving the set-up violation. The FF at the end point of a set-up violation path is replaced by the FF provided with a delay for delaying the clock.

Patent Document 3 (Japanese Patent Laid-Open No 2006-319162) discloses a clock tree generation method which can perform reduction of the power consumption and improvement of a set-up/hold error. This is a technique of reducing the power consumption by reducing the number of delay elements on the clock tree and resolving the error by re-arranging cells configuring a path where the set-up/hold error is caused and by reducing wiring lengths. Clock load cells (typically, FF) are re-arranged so as to cause the wiring length from the clock generation source to the clock load cell to fall within a predetermined range, and thus the number of buffers on the clock tree is reduced to a minimum to be required and the set-up/hold error is resolved at the same time.

SUMMARY

As described above, the CTS synthesizes the clock tree so as to equalize the clock delays (make the skews zero) up to all the timing definition circuits such as the FFs, and thus the CTS sets the clock delay up to the timing definition circuit, which is located farthest from the clock generation source, to be a reference and causes the delays in all the other clock propagation paths to coincide with this reference. Accordingly, in the clock tree for the FF close to the clock generation source, many buffers are inserted for skew adjustment.

The inventors of the present application has focused on this point and has found that power consumption in the clock tree can be suppressed by elimination of the buffer which is inserted for such skew adjustment, if the timing violation does not occur.

While, in the technique disclosed in Patent Document 1, the clock buffer is added or eliminated on the clock tree for resolving the set-up violation and the elimination resultantly provides an effect of reducing the power consumption in the clock tree, the document does not disclose any technical concepts for reducing the power consumption.

In the technique disclosed in Patent Document 2, replacing the end point FF by the FF provided with a delay for delaying the clock is equivalent to insert a delay element in the clock tree in terms of a circuit and resultantly increases the power consumption in the clock tree.

In the technique disclosed in Patent Document 3, the set-up/hold error is improved while the power consumption is suppressed so as to be smaller, but the power consumption reduction is obtained only at a level when the wiring load is suppressed to a minimum to be required by the cell layout optimization while the skew is kept small.

An embodiment disclosed in the present application aims to reduce the number of buffers on the clock tree more aggressively as long as there is enough timing margin and to reduce the power consumption in the clock tree.

The other objects and the new feature will become clear from the description of the present specification and the accompanying drawings.

An outline of an embodiment of the present application will be explained briefly as follows.

That is, a branch point in a clock tree is focused on, the whole or a part of an FF group coupled to a partial tree, which is apart of the clock tree and expanded from the branch point, is defined as target FFs, and an elimination target buffer is specified under the condition that a slack is not changed in principle in a signal propagation path between non-target FFs. A buffer which can be eliminated among the elimination target buffers is specified to be eliminated as long as timing violation does not occur in each of a signal propagation path having a start point at the non-target FF and an end point at the target FF and a signal propagation path between the target FFs.

An effect obtained by the embodiments disclosed by the present application will be explained briefly as follows.

That is, it is possible to reduce the number of buffers on a clock tree more aggressively as long as there is enough set-up margin and to reduce power consumption in the clock tree.

BRIEF DESCRIPTION OF THE DRAWINGS

FIGS. 6A and 6B are explanatory diagrams for delay value update by rerouting after buffer elimination;

DETAILED DESCRIPTION

1. Outline of an Embodiment

Figure 1:
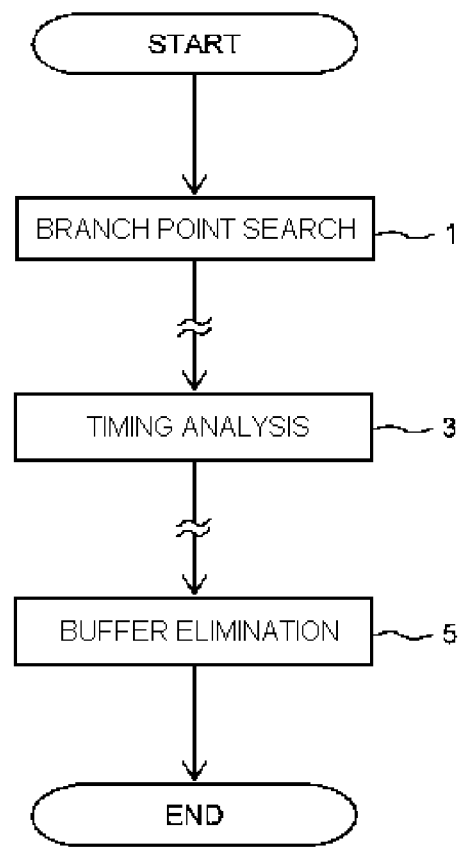
FIG. 1 shows a core part of a design flow representing an LSI design method to which a first embodiment or a second embodiment is applied.

First, an outline of an embodiment to be disclosed in the present invention will be explained. A reference numeral in the drawing to be referred to by an attached parenthesis in the outline explanation about the embodiment only illustrates an element included in the concept of a constituent provided with the reference numeral.

[1] <Buffer Elimination Steps Targeting Buffers Included in One Branch>

An LSI design method executes the following steps for a clock tree (100) constituted by including a plurality of buffers (101 to 166) between a clock generation source (200) and a plurality of timing definition circuits (FF1 to FF8).

The buffers (111, 112, and 113), which exist between one branch point (22) in the clock tree and the next branch point (24) in one branch (31) extending from the branch point toward the timing definition circuits, are defined as target buffers (step 1). The timing definition circuits (FF1 and FF2), which are coupled to terminals of a clock tree (41) expanding from the branch, are defined as target timing definition circuits (51), and the timing definition circuits (FF3 to FF8) except the target timing definition circuits, among the timing definition circuits, are defined as non-target timing definition circuits (52) (step 1).

One or a plurality of buffers included in the target buffers are eliminated (step 5) as long as set-up margin is kept zero or more in all the signal propagation paths (61), having a start point at the non-target timing definition circuit and an end point at the target timing definition circuit (step 3).

As a result, as long as there is enough timing margin, it is possible to reduce the number of the buffers on the clock tree more aggressively and to reduce power consumption in the crock tree.

[2] <Preliminary Set-up Margin Adjustment (Slack): Set-up Margin ≥0>

Item [1] further includes a step (step 14) of adjusting the set-up margin to zero or more in all the signal propagation paths between the timing definition circuits, before the step (15) of eliminating the buffer.

As a result, it is possible to further increase the number of the buffers which can be eliminated.

[3] <Repetition of the Buffer Elimination Steps for all the Branch Points and the Branches>

In item [1] or [2], all the branch points are selected sequentially in the clock tree, all the branches extending from the branch point are selected sequentially, and the steps of eliminating the buffer are performed repeatedly (step 2).

As a result, it is possible to perform determination whether or not elimination is possible for all the buffers in the clock tree and to eliminate more buffers.

[4] <Sequential repeat from the branch point closer to the clock generation source>

In item [3], the branch point closer to the clock generation source is selected first in the branch point selection.

As a result, it is possible to further increase the number of buffers which can be eliminated.

[5] <Narrowing-down of Elimination Candidates (Designation of a Target to be Excluded from the Elimination)>

In item [3] or [4], the branch of an exclusion target is defined (step 6) before the step of eliminating the buffer, and the step of eliminating the buffer is skipped and moved to the next branch point when the target buffer is included in the branch of the exclusion target (step 7).

As a result, it is possible to save useless execution time of a computer and to carry out the design method in a short time.

[6] <Exclusion of the Electrically-longest Path from Elimination Targets>

In item [5], the branch, which is located in a path having the smallest margin for an electrical design rule in the clock tree, is defined as the branch of the exclusion target (step 6).

Therefore, it is possible to save useless execution time of the computer and to carry out the design method in a short time. The electrical design rule indicates a rule provided for the purpose of securing reliability unlike a speed performance specification, such as a regulation of limiting the rise time of a waveform to a predetermined time or shorter, for example. Since the elimination of the buffer which is inserted for the purpose of securing the reliability is not allowed, if the buffer is eliminated, it becomes violation of the electrical design rule in the following verification and process return occurs as the eliminated buffer is returned to the original position. By preliminarily selecting such a buffer as the exclusion target, it is possible to save useless execution time of the computer and to carry out the design method in a short time.

[7] <Exclusion of a Path without Including the Buffer from the Elimination Targets>

In item [5] or [6], the branch, which does not include the buffer, in the clock tree, is defined as the branch of the exclusion target (step 6).

As a result, it is possible to save useless execution time of the computer and to carry out the design method in a short time. In the branch without including the buffer, it is impossible to eliminate the buffer and, by skipping this branch, it is possible to save the useless execution time.

[8] <Use of Design Data after Placement and Routing>

In any one of items [1] to [7], design data after placement and routing (step 14) is used.

As a result, it is possible to eliminate the buffer using a more-accurate delay value.

[9] <Rerouting after the Buffer Elimination and Update of the Delay Value>

In item [8], after executing the step of eliminating the buffer (step 15), the step of performing routing is executed for a wiring from the buffer which drove the input of the eliminated buffer to the buffer which was driven by the eliminated buffer, and a capacitance and a resistance of the wiring are extracted and a delay value of the buffer which drove the input of the eliminated buffer is calculated on the basis of the capacitance and the resistance (step 8).

As a result, it is possible to perform the timing analysis accurately when the timing analysis is to be performed after the buffer elimination, for example, when further buffer elimination for a target of another buffer (step 15) is to be executed.

[10] <Timing Definition Circuit: An FF or the Like>

In any one of items [1] to [9], the timing definition circuit is a flip-flop, a latch, a clock-synchronous type memory, or a gate for clock gating.

As a result, even when the timing definition circuit is a circuit except the flip-flop, the present LSI design method can be applied.

[11] <Elimination Targeting the Buffers Included in all the Branches Extending from One Branch Point>

An LSI design method executes the following steps for a clock tree (100) constituted by including a plurality of buffers (101 to 166) in branches from a clock generation source (200) to a plurality of timing definition circuits (FF1 to FF8).

The buffers (131 to 136) existing from one branch point (24) in the clock tree to terminals of a partial tree (41) expanding from the branch point are defined as target buffers. The timing definition circuits (FF1 to FF2) coupled to the terminals of the partial tree are defined as target timing definition circuits (51), and the timing definition circuits (FF3 to FF8) except the target timing definition circuits, among the timing definition circuits, are defined as non-target timing definition circuits (52) (step 1).

One or a plurality of buffers included in the target buffers are eliminated (step 5) as long as set-up margin and hold margin can be kept zero or more in all the signal propagation paths (62) between the target timing definition circuits, and also as long as the set-up margin can be kept zero or more in all the signal propagation paths (61) which have a start point at the non-target timing definition circuit and an end point at the target timing definition circuit (step 3).

As a result, it is possible to reduce the number of the buffers on the clock tree more aggressively, as long as there is enough timing margin and to reduce the power consumption in the clock tree.

[12] <Preliminary Set-up Margin Adjustment: Set-up Margin (Slack) ≥0>

Item [11] further includes steps (steps 11 to 14) of adjusting the set-up margin to zero or more in all the signal propagation paths between the timing definition circuits, before the step of eliminating the buffer.

As a result, it is possible to increase the number of the buffers which can be eliminated.

[13] <Clustering>

Item [11] or [12] further includes, before the step of eliminating the buffer, a step of coupling the timing definition circuits at start points of the signal propagation paths via the same combination circuit and the timing definition circuits at end points of these signal propagation paths among the timing definition circuits, to the partial tree expanding from the same branch point.

As a result, it is possible to further increase the number of buffers which can be eliminated. This is because a group of a series of the combination circuits which are strongly related to one another is coupled to the same partial tree in a unified manner, and thus it becomes easy to satisfy the condition for the buffer elimination.

[14] <Simultaneous Elimination of the Buffers from a Plurality of Branches>

In any one of items [11] to [13], the timing definition circuit coupled to the partial tree expanding from a first branch is set as a start point and the timing definition circuit coupled to the partial tree expanding from a second branch different from the first branch is set as an end point, in the signal propagation path between the target timing definition circuits. Then, one or a plurality of buffers among the target buffers included in the first branch and one or a plurality of buffers among the target buffers included in the second branch are eliminated as long as the set-up margin and the hold margin can be kept zero or more.

As a result, it is possible to eliminate even the buffer which cannot be eliminated in the elimination step only targeting the buffer included in one branch.

[15] <<Repetition for Each of the Branch Points>

In any one of items [11] to [14], the step of eliminating the buffer is repeated for all the branch points included in the clock tree.

As a result, it is possible to perform determination whether or not elimination is possible by targeting all the buffers in the clock tree and to eliminate more buffers.

[16] <Sequential Repeat from the Branch Point Farther from the Clock Generation Source>

In item [15], the step of eliminating the buffer is repeated in order from the branch point farther from the clock generation source.

As a result, it is possible to further increase the number of the buffers which can be eliminated.

[17] <Narrowing-down of Elimination Candidates (Designation of an Exclusion Target from the Elimination)>

In item [15] or [16], the branch of an exclusion target is defined before the step of eliminating the buffer (step 6), and the step of eliminating the buffer is skipped and moved to the next branch, when the target buffer is included in the branch of the exclusion target (step 7).

As a result, it is possible to save useless execution time of the computer and to carry out the design method in a short time.

[18] <Exclusion of the Electrically-longest Path from Elimination Targets>

In item [17], the branch located in a path having the smallest margin for the electrical design rule in the clock tree is defined as the branch of the exclusion target (step 6).

As a result, it is possible to save useless execution time of the computer and to carry out the design method in a short time.

[19] <Exclusion of a Path without Including the Buffer from the Elimination Targets>

In item [17] or [18], the branch not including the buffer, in the clock tree, is defined as the branch of the exclusion target (step 6).

As a result, it is possible to save useless execution time of the computer and to carry out the design method in a short time. In the branch not including the buffer, it is impossible to eliminate the buffer, and thus, by skipping this branch, it is possible to save the useless execution time.

[20] <Timing Definition Circuit: An FF or the Like>

In any one of items [11] to [19], the timing definition circuit is a flip-flop, a latch, a clock-synchronous type memory, or a gate for clock gating.

As a result, even when the timing definition circuit is a circuit except the flip-flop, the present LSI design method can be applied.

2. Details of the Embodiments

Embodiments will be further explained in detail.

[First Embodiment]

Figure 2:
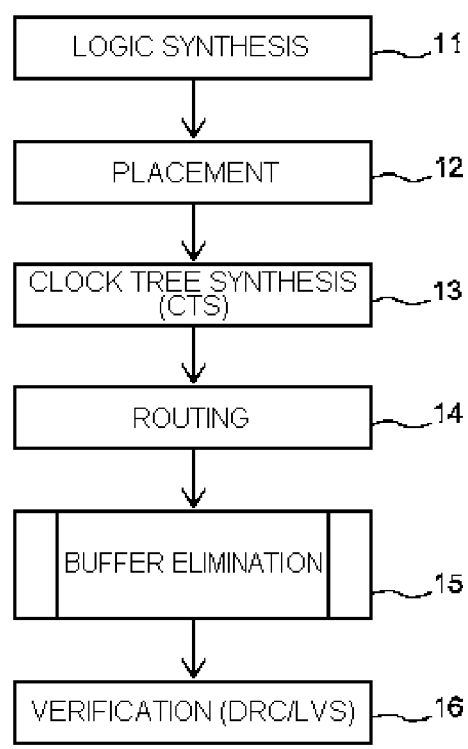
FIG. 2 shows the whole design flow representing an LSI design method to which the first embodiment or the second embodiment is applied.
Figure 4:
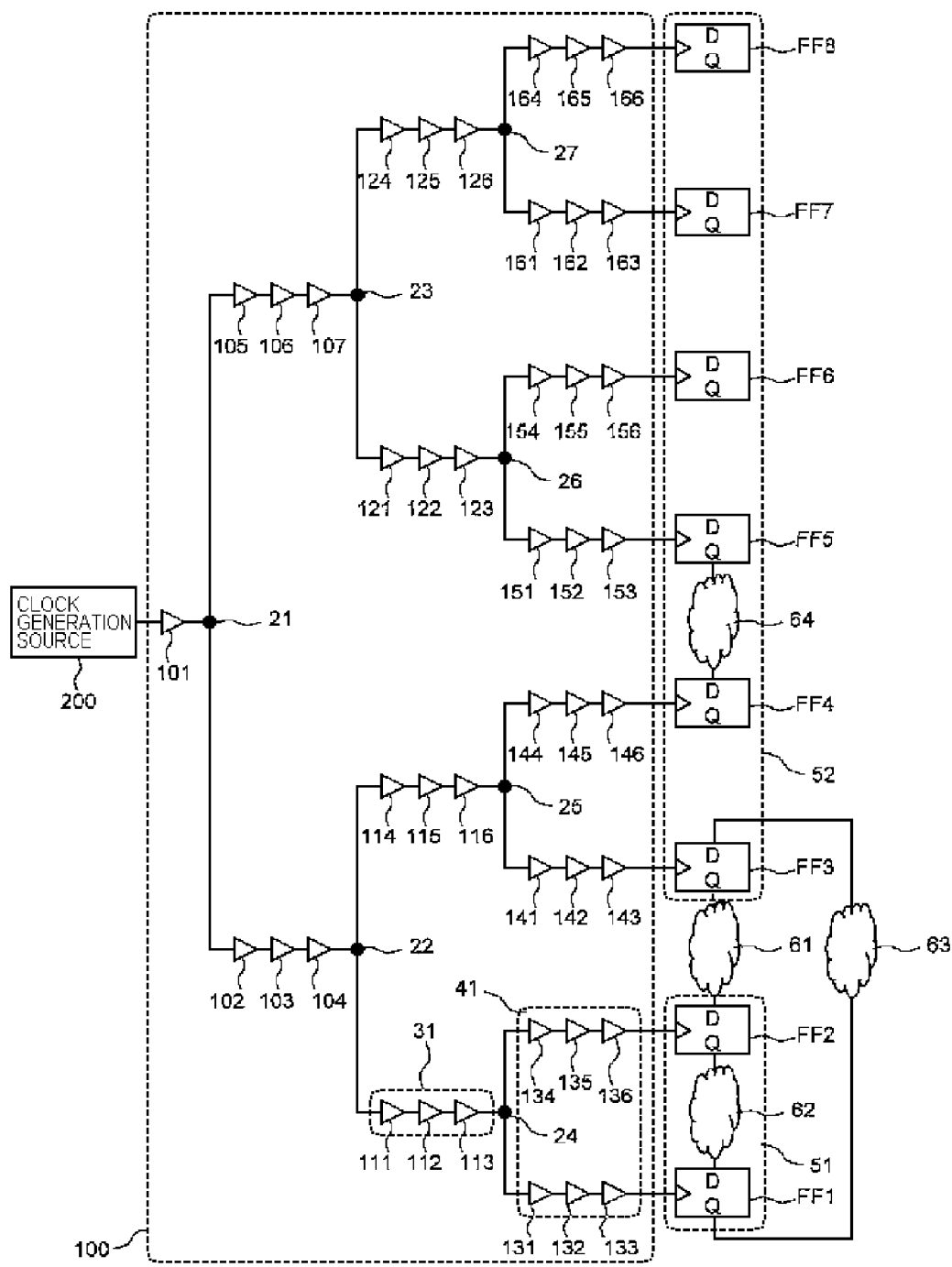
FIG. 4 is an explanatory diagram showing an example of a buffer elimination method according to the first embodiment.
Figure 5:
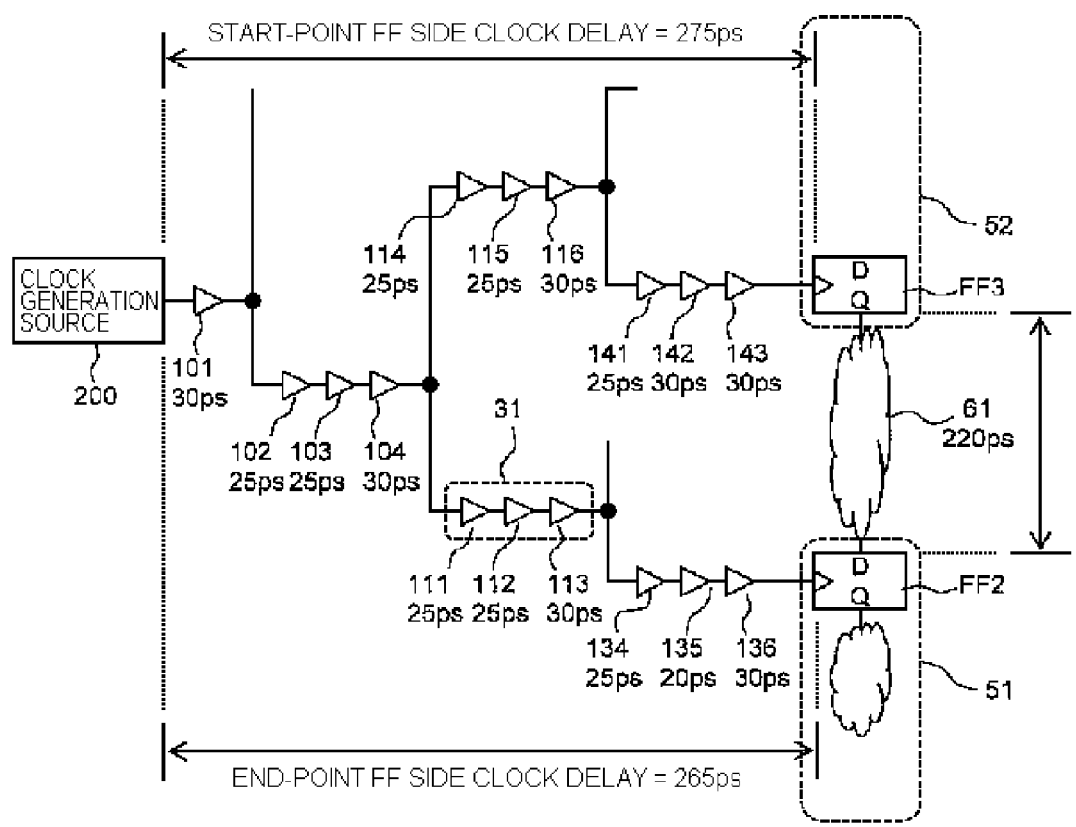
FIG. 5 is an explanatory diagram showing an example of timing analysis for buffer elimination according to the first embodiment.

FIGS. 1 and 2 show design flows representing an LSI design method to which a first embodiment is applied, and FIG. 1 shows a core part thereof and FIG. 2 shows the whole design flow including the core part. FIG. 4 is an explanatory diagram showing an example of a buffer elimination method by the first embodiment, and FIG. 5 is an explanatory diagram showing an example of timing analysis for the buffer elimination.

A design flow representing the LSI design method, to which the first embodiment is applied, will be explained with reference to FIG. 1.

The present embodiment focuses on a branch point of a clock tree, and includes steps of determining whether or not elimination is possible by targeting clock buffers included in one of a plurality of branches extending from the branch point.

Step 1 performs branch point search. The buffer, which exists between one of the branch points in the clock tree and the next branch point in one branch extending from this branch point, is defined as a target buffer of an elimination candidate. FFs coupled to terminals of a clock tree expanding from the branch to be focused on are defined as target FFs and the other FFs are defined as non-target FFs.

Step 3 performs timing analysis for determining whether or not the buffer can be eliminated. When some of the target buffers are assumed to have been eliminated, step 3 performs the timing analysis whether or not the set-up margin can be kept zero or more, in all the signal propagation paths having a start point at the non-target FF and an end point at the target FF.

Step 5 performs buffer elimination. Step 5 eliminates one or a plurality of buffers among the target buffers on the basis of the above timing analysis result. When, as the result of the above timing analysis, it is determined that the set-up margin cannot be kept zero or more if the buffer is eliminated, Step 5 does not perform the buffer elimination.

The above steps are the core part of the design flow representing the LSI design method to which the first embodiment is applied, and as shown in FIG. 2, preferably the steps are executed after Logic Synthesis (step 11), placement (step 12), Clock Tree Synthesis (CTS) (step 13), and routing (step 14), in the LSI design flow. Verification (step 16) is executed after the buffer elimination (step 15). The buffer elimination (step 15) may be executed after the Logic Synthesis (step 11) and the CTS (step 13) and before placement and routing (steps 12 and 14). In the latter case, the step of eliminating the buffer is executed before the placement, and thus a delay value based on a wiring capacitance and a wiring resistance, which are extracted from layout information, cannot be referred to in the timing analysis thereof (step 3). The timing analysis is executed by the use of a delay value modeled by assuming a wiring capacitance and a wiring resistance. Typically, since the modeled delay value includes a large margin, when the buffer elimination (step 15) is executed after the placement and routing as shown in FIG. 2, it is determined in step 3, with a higher probability, that the buffer can be eliminated, and thus it is possible to eliminate more buffers. After the buffer elimination (step 15) has been completed, the verification such as design rule check (DRC) and verification of the layout and a circuit diagram (LVS) are performed (step 16) and the design flow is finished.

Before executing the buffer elimination (step 15), it is preferable to adjust the set-up margin (slack) to be zero or more between all the FFs. This is because, since it is determined in the timing analysis (step 3) whether the slack can be kept zero or more even when the buffer is eliminated, the buffer cannot be eliminated if the slack is negative before the elimination.

The timing analysis (step 3) will be described in detail. When the target buffer is eliminated, the set-up margin, that is, the slack is reduced by the delay amount of the eliminated buffer, in all the signal propagation paths having the start point at the non-target FF and the end point at the target FF. Among the target buffers, it is possible to eliminate the buffers having delay values in which the total delay value thereof does not exceed the slack value. In contrast, it is not necessary to consider the other signal propagation paths. The slack of the signal propagation path having a start point at the target FF and an end point at the non-target FF is increased rather by the elimination of the buffer from the target buffers. This is because output timing from the target FF of the start point is made earlier by the elimination of the target buffer. The slacks in the signal propagation paths between the non-target FFs and between the target FFs are not changed by the elimination of the buffer from the target buffers. This is because clock arrival time at the non-target buffer is not changed by the elimination of the target buffer and clock arrival time at the target buffer is uniformly made early by the elimination of the target buffer.

In the present embodiment, it becomes possible to clearly distinguish the combination circuit in which the slack is affected by the buffer elimination and the combination circuit in which the slack is not affected, by defining the target buffer and the target and non-target FFs as described above, and it is clarified that it is enough to focus on only the path in which the slack is deteriorated. As a result, it becomes possible to carry out the buffer elimination in the clock tree systematically.

Specific illustration will be explained in detail with reference to FIG. 4. The branch point focused on in step 4 is denoted by reference numeral 22 and the branch focused on is denoted by reference numeral 31. The buffers 111, 112, and 113 included, in the branch 31 focused on, up to the next branch point 24 are the target buffers. FF1 and FF2 coupled to terminals of a partial tree 41 which expands from the branch 31 focused on are the target FF (51) and other FF3, FF4, FF5, FF6, FF7, and FF8 are the non-target FFs (52). While combination circuits exist between the FFs, the combination circuits are shown representatively only by a combination circuit 61 having a start point at the non-target FF and an end point at the target FF, a combination circuit 62 having a start point and an end point at the target FFs, a combination circuit 63 having a start point at the target FF and an end point at the non-target FF, and a combination circuit 64 having a start point and an end point at the non-target FFs.

A feature utilized in the present embodiment is that the slacks of the combination circuits 62 and 64 are not affected even when any number of the target buffers 111, 112, and 113 is eliminated.

The combination circuit 64 is coupled to a position which is not affected by the elimination of the target buffer in the clock tree. For the combination circuit 62, while the clock arrival time at the start point and the end point becomes earlier by a delay time of the eliminated buffer, the arrival time becomes only earlier equally at the start point and the end point, and thus the slack is not affected. For the combination circuit 63, since the start point is the target FF, output becomes earlier at the start point and the slack, that is, a margin, becomes larger.

In contrast, the combination circuit 61, since the start point is the non-target FF and the end point is the target FF, the clock arrival time becomes earlier at the end point while the clock arrival time at the start point is not changed by the elimination of the target buffer. The slack reduces the margin by the delay time of the eliminated buffer. In other words, when focusing only on the slack for the signal propagation delay from the start point at the non-target FF to the end point at the target FF, as in the combination circuit 61, it is possible to eliminate one or a plurality of buffers from the target buffers a long as this slack does not become negative. It is preferable to eliminate one or a plurality of buffers from the target buffers so as not to cause the slack to become negative for the worst case FF pair, in all the signal propagation paths having the start point at the non-target FF and the endpoint at the target FF. This is because, if the slack of the worst case FF pair does not become negative, obviously the slacks of the other pairs do not become negative.

FIG. 5 shows, in further detail, an example of the timing analysis (step 3) for the buffer elimination. The FF pair for the worst case is shown in the signal propagation paths from the non-target FF 52 to the target FF 51. Here, in the timing analysis, a formula for obtaining the slack is as follows.

Slack=(Clock delay up to target FF+Clock period)−(Clock delay up to non-target FF+Signal propagation delay in a data path)

In FIG. 5, the slack is calculated as Slack=(265+300)−(275+220)=70 ps. Here, the clock period is assumed to be 300 ps and the set-up margin required by the FF itself is neglected for simple explanation. The signal propagation delay is 220 ps for the combination circuit 61 having the start point at FF3 of the non-target FF and the end point at FF2 of the target FF. Since the clock delay to FF3 is 265 ps and the clock delay to FF2 is 270 ps, the slack becomes ps. It is allowable to eliminate the buffers corresponding to the delay of 70 ps from the target buffers. When the buffers 111 and 112 are eliminated, the total delay thereof is 50 ps and the slack becomes 20 ps. When the buffers 112 and 113 are eliminated, the total delay thereof is 55 ps and the slack becomes 15 ps. Since the total delay of the three target buffers 111, 112, and 113 is 80 ps, and if all of the three buffers are eliminated, the slack becomes −10 ps resulting in the set-up violation, and thus all the buffers cannot be eliminated. It is possible to eliminate the buffers without causing the timing violation as long as the slack does not become negative only in the FF pair which is the above worst case, and it is possible to reduce the power consumption due to the clock tree.

As a result, as long as there is enough set-up margin, it is possible to eliminate the buffers on the clock tree more aggressively and to thereby reduce the power consumption in the clock tree. As a result of the CTS (step 13), delay is adjusted so as to be constant from the clock generation source to all the FFs in the clock tree, in order to make the skew zero. In the present embodiment, it is possible to determine and eliminate the buffer which does not cause the set-up violation when eliminated, analytically and also efficiently.

While, hereinabove, only the case where the timing definition point is the FF has been explained, the present embodiment can be applied similarly even when the timing definition point is a latch or a gate for a synchronous type clock or clock gating. This is the same in the following modifications.

[Modification of the First Embodiment (Repetition of the Buffer Elimination Steps for all the Branch Points and the Branches)]

Figure 3:
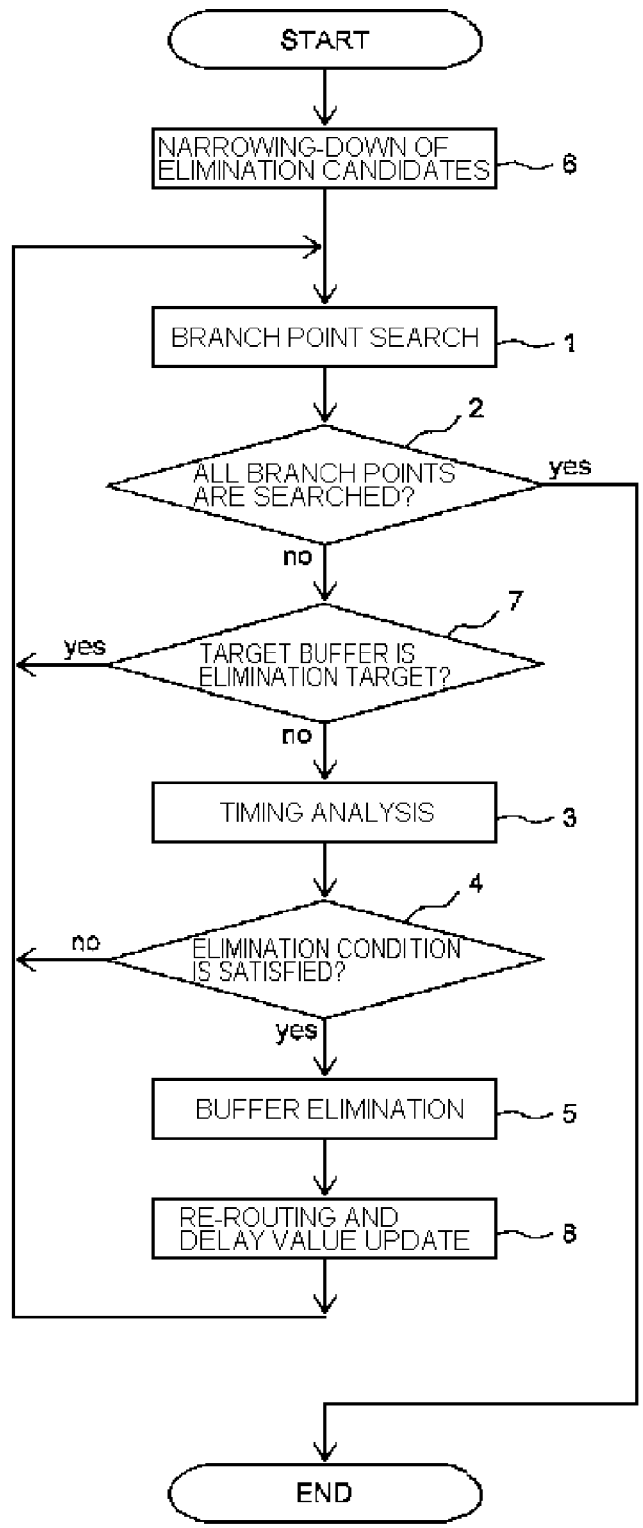
FIG. 3 is a core part of a design flow representing an LSI design method to which the first embodiment or the second embodiment is applied.

FIG. 3 is a design flow representing an LSI design method in which various modifications are applied to the first embodiment.

For repeating the buffer elimination steps for all the branch points and the branches, there is provided a determination step (step 2) whether or not all the branch points have been searched after the branch point search (step 1). All the branch points in the clock tree are selected sequentially, all the branches extending from the branch point are selected sequentially, and the buffer elimination steps (steps 3 to 5) are executed repeatedly.

It is not always necessary to define all the branch points in the clock tree as sequential determination targets, and all the buffers in the clock tree may be exhaustively defined as the determination targets, and thus it is possible to eliminate every buffer which can be eliminated by the algorism of the present embodiment.

While the order of the search does not have any particular restriction, after the branches extending from one branch point have been defined as the sequential determination targets, the branch point to be focused on is more preferably shifted sequentially from an upstream side near the clock generation source to a downstream side. By giving priority to the upstream side, it is possible to sequentially extract the buffers of elimination targets by wider range of timing analysis, and thus there is a higher possibility of eliminating more buffers.

[Modification of the First Embodiment (Narrowing-down of the Elimination Candidates)]

Before the branch point search, the buffer, the branch, or the branch point, which is not allowed to be eliminated because of another factor such as reliability, is designated as an exclusion target and the elimination candidates are preliminarily narrowed down, and thus it is possible to reduce the whole execution time. As shown in FIG. 3, the elimination candidate narrowing-down (step 6) and determination (step 7) whether or not the target buffer is the exclusion target are added.

The elimination candidate narrowing-down (step 6) designates, as the exclusion target, the buffer, the branch, or the branch point which cannot be eliminated, before the branch point search (step 1). After the branch point search (step 1), it is determined whether or not the branch point focused on, branch, or target buffer is the exclusion target designated in step 9 (step 7), and, if it is the exclusion target, the following timing analysis (step 3) and the buffer elimination (step 5) are not executed and the process returns to the branch point search (step 1).

For the exclusion target, it is possible to designate, for example, the clock buffer disposed in a clock propagation path having the smallest margin for the electrical design rule.

In the CTS (step 13), the delays from the clock generation source 200 to the FFs at the terminals are adjusted so as to be the same. For this purpose, the clock delays are adjusted to be the same as the delay from the clock generation source to the farthest FF. At this time, the clock propagation path to the farthest FF in the clock tree is designed so as to have the smallest delay as far as the electrical design rule allows. This is because, since the maximum delay becomes the delay of the whole clock tree, the design of the clock propagation path so as to minimize the maximum delay reduces the delay in the whole clock tree and leads to suppression of a circuit size and power consumption. Accordingly, there are many cases where the clock propagation path to the farthest FF in the clock tree resultantly becomes a path having the smallest margin for the electrical design rule. The electrical design rule indicates a rule provided separately from a speed performance specification for the purpose of securing reliability or the like, such as a regulation of limiting the rise time and the fall time of a waveform, to a predetermined time or shorter. The clock buffer in this clock propagation path is not allowed to be eliminated. This is because, if this clock buffer is eliminated, the electrical design rule violation occurs and reliability of the whole LSI cannot be secured in some cases. Such a clock propagation path and the buffer included in this path can be respectively designated as an exclusion target branch and an exclusion target buffer. When, other than this buffer, there is a buffer which is not allowed to be eliminated because of any reason, the buffer is designated similarly as the exclusion target.

In the clock tree, there exists a branch not including buffers. Such a branch is designated as the exclusion target, since the buffer to be eliminated does not exist from the start.

As a result, it is possible to save useless execution time of the computer and to carry out the design method in a short time. This is because the buffer, the branch, and the branch point which are not allowed to be eliminated in principle can be finished without executing the timing analysis (steps 3 and 4).

[Modification of the First Embodiment (Rerouting and Delay Value Update after the Buffer Elimination)]

Wiring is changed by the buffer elimination and the delay value changes at positions before and after the eliminated buffer. In order to deal with these changes, as shown in FIG. 3, rerouting and delay value update (step 8) is added.

The rerouting and delay value update (step 8) extracts a capacitance and a resistance of a changed wiring part and performs delay calculation again on the basis of the extraction, to thereby update the delay time of the buffer which drives the wiring. For other wirings, the delay time before the buffer elimination is used without change, and thus a series of processing times is not increased.

FIGS. 6A and 6B show examples of the timing analysis before and after the buffer elimination. When the buffer 112 is eliminated from the target buffers 31, wirings 251 and 252 which were bent toward the buffer 112 before the buffer elimination (a) are rerouted along with the buffer elimination and become a long straight line 253 after the elimination of the buffer 112 (b). Since the load capacitance and the wiring resistance for the buffer 111 replace wiring 251 with the wiring 253, the delay time of the buffer 111 is recalculated to be updated by the extraction of a load capacitance and a wiring resistance by the wiring 253.

As a result, it is possible to perform the timing analysis accurately after the buffer elimination, for example, the timing analysis (step 3) when the buffer elimination (step 15) is to be executed further by targeting another buffer by the branch point search (steps 1 and 2).

While, in the timing analysis (step 3), it is determined whether or not the buffer can be eliminated, only on the basis of addition and subtraction of the delay values before the rerouting, it is necessary, to be precise, to reconfirm the determination when the rerouting and the delay value update is performed afterward. In the step of the timing analysis (step 3), when a buffer is assumed to be eliminated from the target buffers, it is also possible to determine whether or not the buffer elimination is possible, by assuming buffer delay value update related to the rerouting. Furthermore, it is also possible to estimate a delay value after the update by using simple modeling, without actually performing the rerouting and performing the extraction of a capacitance and a resistance.

[Second Embodiment]

The first embodiment, when there exist the branches extending from a branch point, defines the target buffer and the target FF by focusing on one of the branches, and determines the buffer to be eliminated. The present embodiment defines the target buffer and the target FF by focusing on the branches extending from one branch point at the same time, and determines the buffer to be eliminated.

The core part of a design flow is the same as that in FIG. 1, and steps which can be inserted in the LSI design flow are the same as the steps which are shown in FIG. 2 and explained in the first embodiment. Furthermore, various modifications are also the same as the variations which are shown in FIG. 3 and the first embodiment explained with reference to FIG. 3. In the following, explanation will be provided centering a point different from the first embodiment.

Figure 7:
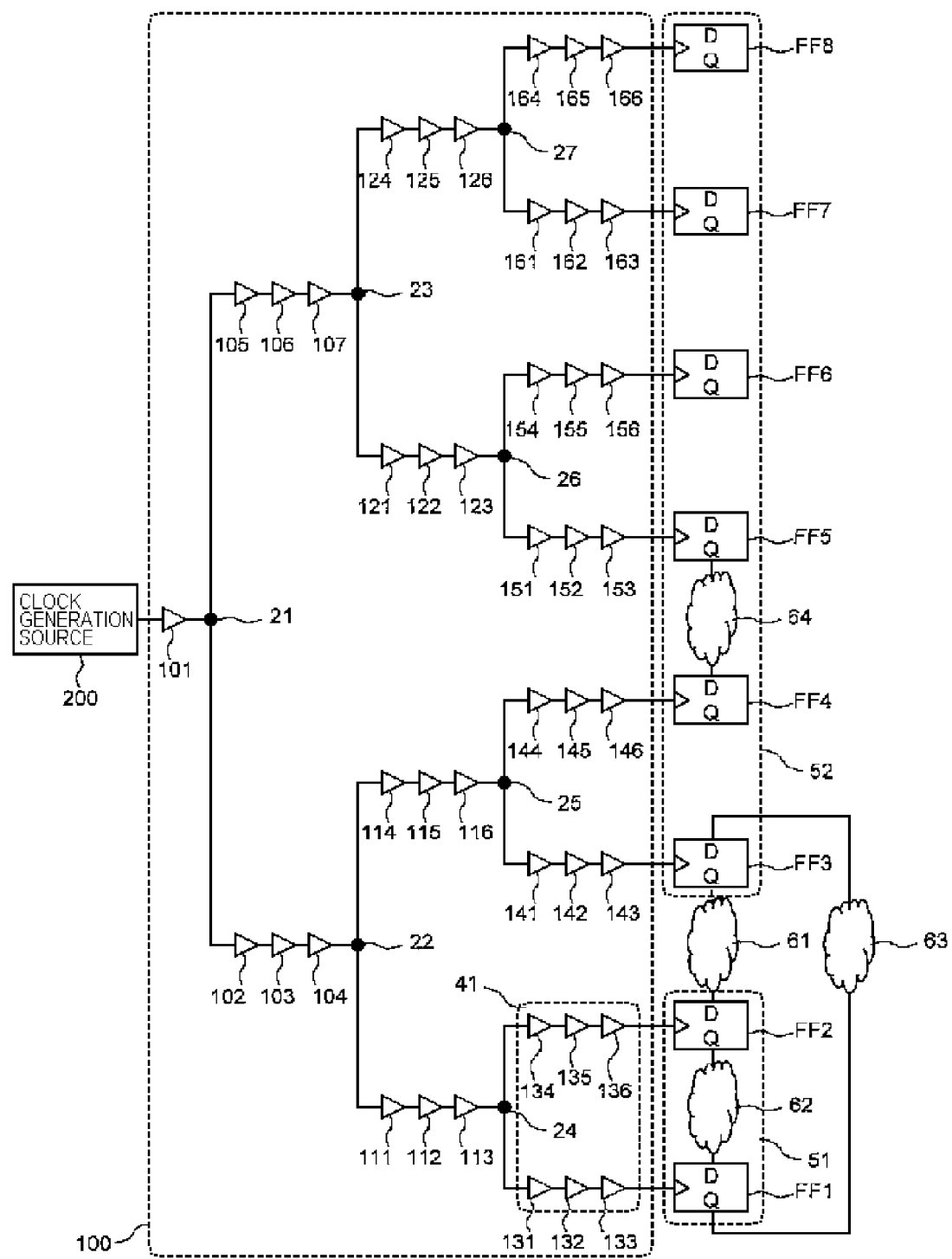
FIG. 7 is an explanatory diagram showing an example of a buffer elimination method according to the second embodiment.

With reference to FIG. 7, a buffer elimination method of the present embodiment will be explained.

A clock generation source 200, a clock tree 100, and FF1 to FF8 of the timing definition circuits are the same as those shown in FIG. 4. Furthermore, the illustration of a combination circuit between the FFs is omitted optionally.

One of branch points 24 in the clock tree is focused on. Buffers 131 to 136 which exist up to terminals of a partial tree 41 expanding from the branch point are defined as the target buffers. The timing definition circuits FF1 to FF2 which are coupled to the terminals of the partial tree 41 are defined as the target FFs 51, and the other timing definition circuits FF3 to FF8 are defined as the non-target FFs 52.

One or a plurality of buffers included in the target buffers is eliminated as long as the set-up margin and the hold margin can be kept zero or more in all the signal propagation paths between the target FFs and also as long as the set-up margin can be kept zero or more in all the signal propagation paths having the star point at the non-target FF and the end point at the target FF.

Figure 8:
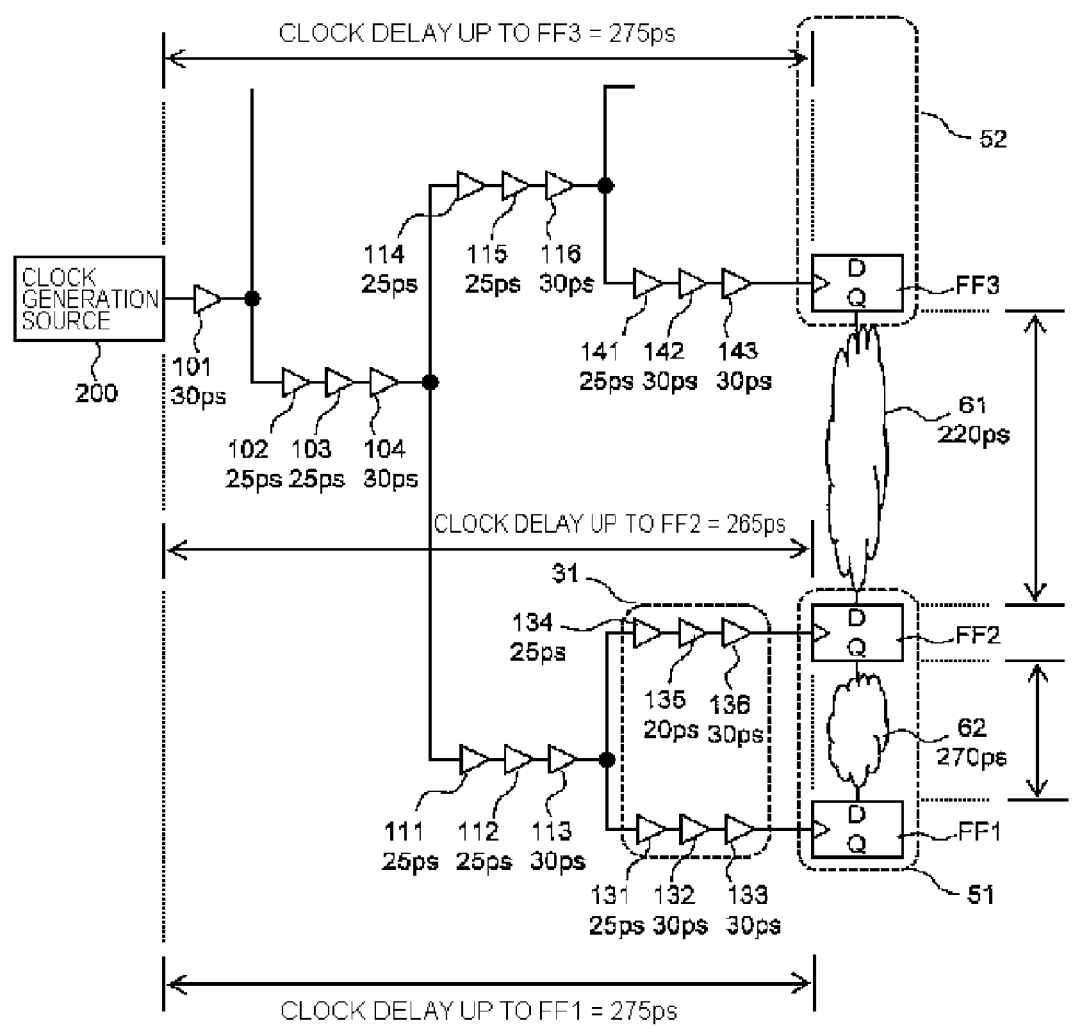
FIG. 8 is an explanatory diagram showing an example of timing analysis for buffer elimination according to the second embodiment.

With reference to FIG. 8, more specific explanation will be provided. FIG. 8 is an explanatory diagram showing an example of the timing analysis for the buffer elimination by the second embodiment. The signal propagation delay of a combination circuit 61 having a start point at FF3 which is the non-target FF and an end point at FF2 which is the target FF, is 220 ps. Since the clock delay to FF3 is 275 ps and the clock delay to FF2 is 265 ps, the slack becomes 70 ps when the clock period is set to 300 ps. The buffers corresponding to 70 ps may be eliminated from the target buffers. In contrast, the signal propagation delay of a combination circuit 62 ranging from FF2 to FF1, as an example of a signal propagation path between the target FFs, is 270 ps. Since the clock delay to FF2 is 265 ps and the clock delay to FF1 is 275 ps, the slack becomes 40 ps. Here, the buffers 135 and 136 and the buffers 132 and 133, for example, can be eliminated from the target buffers. While the slack of the combination circuit 61 is reduced from 70 ps to 20 ps by the elimination of the buffers 135 and 136, the slack is still zero or more, and thus the set-up violation does not occur. At this time, if the buffers 135 and 136 are only eliminated, the timing regulation violation may occur in the signal propagation path between the target FFs, and thus the target buffers up to the target FFs are eliminated as uniformly as possible. In the example of FIG. 8, the clock delays of the buffers 132 and 133 are eliminated also from the clock delay to FF1. The clock delay up to FF1 becomes 215 ps from 275 ps, and the slack for the signal propagation delay in the combination circuit 62 is reduced from 40 ps to 30 ps.

As a result, it is possible to eliminate more buffers than in the first embodiment. The first embodiment eliminates the buffers in a part common to the target FFs in the partial tree for the target FFs, and thus determines whether or not the buffer elimination is possible, without changing the slack between the target FFs at all. Accordingly, the signal propagation delay between the target FFs was able to be excluded from the targets of the timing analysis (step 3). In contrast, there can be simply eliminated the buffers included in the part common to the target FFs in the partial tree, that is, included in one branch.

The second embodiment, unlike the first embodiment, can eliminate the buffers from the branches at the same time, and thus has a great effect of reducing the power consumption. In contrast, the uniform elimination of the buffers in the branches is not actually possible and causes a variation in reduction amounts of the clock delays. Accordingly, it is necessary to execute the timing analysis (step 3) on the assumption that the buffers are eliminated and to execute the elimination while verifying that the set-up and hold violation are not caused between the target FFs. Note that the timing analysis is performed only between the target FFs, and thus a time much shorter than STA of the whole LSI is needed.

[Modification of the Second Embodiment (<Repetition of the Buffer Elimination Steps for all the Branch Points)]

As shown in FIG. 3, for repeating the buffer elimination steps for all the branch points and branches as in the first embodiment, there is provided a determination step (step 2) whether or not all the branch points have been searched after the branch point search (step 1). All the branch points in the clock tree are selected sequentially and the elimination steps (steps 3 to 5) are executed repeatedly by targeting the buffers included in all the branches extending from this branch point.

Although the order of the branch point search does not have any particular restriction, it is preferable, in the second embodiment, to execute the search from the downstream side FF while the search is executed from the upstream side of the clock generation source 200 to the downstream side in the first embodiment. As a result, it is possible to eliminate more buffers than in the first embodiment.

[Modification of the Second Embodiment (Clustering)]

In the second embodiment, it is possible to suppress the variation of the slack among the target FFs, by eliminating, at the same time, the buffers included in the branches driving the target FFs. In contrast, the variation of the slacks between the target FF and the non-target FF is large.

When many signal propagation paths exist between the target FF and the non-target FF and also the set-up margins (slacks) thereof are small, a probability that the buffer elimination condition is determined to be satisfied in steps 3 and 4, becomes low. For resolving this point, in the CTS (step 13), it is preferable to perform processing of coupling the FFs at start points and end points of the signal propagation paths via the same combination circuit, to a partial tree expanding from the same branch point. The combination circuit having inputs from a plurality of FFs and outputs to a different plurality of FFs, for example, a combination circuit such as an ALU, has a small number of signal inputs and outputs from and to other combination circuits, and thus preferably the input FF group and the output FF group are configured to be driven by one partial tree. This processing is referred to as clustering. There is an advantage such as the fact that mutually deeply-related FFs can be arranged physically close to each other and a longer wiring can be prevented, and thus this method is employed generally.

In the second embodiment, it is expected that the signal propagation path is made shorter between the non-target FF and the target FF having a large slack variation, when the clustering is executed before the buffer elimination (step 15). Furthermore, in the case of the above ALU, it is expected that the signal propagation path from another circuit is a propagation path for a signal having a sufficiently large slack such as an operation mode setting signal. Accordingly, the buffer elimination for the FFs which has been subjected to the clustering is expected to comparatively increase the number of buffers which can be eliminated.

Note that, the clustering, while working more effectively in the second embodiment, is also effective when applied to the first embodiment. This is because the first embodiment is the same in that the buffer elimination does not change the slack between the target FFs and changes only the slack between the non-target FF and the target FF.

While, hereinabove, the invention achieved by the present inventors has been explained specifically on the basis of the embodiments, obviously the present invention is not limited to the embodiments and can be modified variously within a scope not departing the gist of the present invention.

For example, while, in the embodiments, the design method of performing the elimination of the clock buffer from the clock tree is explained only in one clock system, in a LSI including a plurality of clock systems, the present embodiments can be applied to the clock tree in each of the clock systems.

What is claimed is:

1. An LSI design method for a clock tree including a plurality of buffers between a clock generation source and a plurality of timing definition circuits, the LSI design method comprising:
    using a computer to perform the steps of:
        defining one or more target buffers which exists between one branch point in the clock tree and a next branch point in one branch extending from the one branch point toward the timing definition circuits;
        defining the timing definition circuits, which are coupled to terminals of a partial clock tree expanding from the one branch, as target timing definition circuits;
        defining the timing definition circuits except the target timing definition circuits as non-target timing definition circuits; and
        eliminating one or more of the target buffers which reduces a set-up margin in at least one signal propagation path having a start point at one of the non-target timing definition circuits and an end point at one of the target timing definition circuits while maintaining set up margins to be greater than or equal to zero in all the signal propagation paths having a start point at one of the non-target timing definition circuits and an end point at one of the target timing definition circuits.

2. The LSI design method according to claim 1, further comprising:
    using the computer to further perform the step of:
        adjusting the set-up margin to be equal to or greater than zero or more in all the signal propagation paths between the timing definition circuits, before the step of eliminating the one or more of the target buffers.

3. The LSI design method according to claim 1,
    wherein each of the branch points in the clock tree are selected sequentially as the one branch point,
    all the branches extending from the one branch point are selected sequentially as the next branch point, and
    the step of eliminating the one or more target buffers is performed for each sequentially selected one branch point and next branch point.

4. The LSI design method according to claim 3,
    wherein one of the branch points closest to the clock generation source is selected first as the one branch point.

5. The LSI design method according to claim 3, further comprising:
    using the computer to further perform the step of:
        defining the branch of an exclusion target before eliminating the one or more target buffers, and
    wherein the step of eliminating the one or more target buffers is skipped and moved to the next branch point, when the target buffers are included in the branch of the exclusion target.

6. The LSI design method according to claim 5,
    wherein the branch, which is located in a path having the smallest margin for an electrical design rule in the clock tree, is defined as the branch of the exclusion target.

7. The LSI design method according to claim 5,
    wherein the branch, which does not include one or more of the buffers, in the clock tree, is defined as the branch of the exclusion target.

8. The LSI design method according to claim 1,
    wherein design data after placement and routing is used.

9. The LSI design method according to claim 8, further comprising:
    using the computer to further perform the step of:
        after executing the step of eliminating the one or more target buffers, routing for a wiring from the one of the buffers, which drove an input of the eliminated one or more target buffers, to the one of the buffers which was driven by the eliminated one or more target buffers, and a capacitance and a resistance of the wiring are extracted and a delay value of the one of the buffers which drove the input of the eliminated one or more target buffers is calculated on the basis of the capacitance and the resistance.

10. The LSI design method according to claim 1,
    wherein each of the timing definition circuit is one of a flip-flop, a latch, a clock-synchronous type memory, or a gate for clock gating.

* * * * *